United States Patent
Kelly et al.

(10) Patent No.: US 10,311,403 B2
(45) Date of Patent: Jun. 4, 2019

(54) PROVIDING FEEDBACK VIA A SOCIAL NETWORK FROM A MEDIA DISTRIBUTION PLATFORM

(75) Inventors: Sean Kelly, San Francisco, CA (US); Thomas Alsina, Mountain View, CA (US); Edward Voas, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/487,380

(22) Filed: Jun. 4, 2012

(65) Prior Publication Data

US 2013/0325745 A1  Dec. 5, 2013

(51) Int. Cl.
*G06Q 10/10* (2012.01)
*G06Q 30/02* (2012.01)
*G06Q 50/00* (2012.01)

(52) U.S. Cl.
CPC ............. *G06Q 10/10* (2013.01); *G06Q 30/02* (2013.01); *G06Q 50/01* (2013.01)

(58) Field of Classification Search
USPC ....................................... 705/319, 347, 26.1
See application file for complete search history.

(56) References Cited

U.S. PATENT DOCUMENTS

| | | | |
|---|---|---|---|
| 7,668,821 B1 * | 2/2010 | Donsbach et al. | 707/765 |
| 8,290,823 B1 * | 10/2012 | Robinson et al. | 705/26.1 |
| 8,359,285 B1 * | 1/2013 | Dicker et al. | 706/45 |
| 8,676,875 B1 * | 3/2014 | Smith | H04L 51/32 705/37 |
| 2008/0032723 A1 | 2/2008 | Rosenberg | |
| 2008/0154698 A1 * | 6/2008 | Flake | G06Q 30/02 705/7.29 |

(Continued)

FOREIGN PATENT DOCUMENTS

CN  102004994 A  4/2011
CN  102033952 A  4/2011
(Continued)

OTHER PUBLICATIONS

Extended European Search Report received in EP Application No. 13170462.9, dated Oct. 16, 2013.
(Continued)

*Primary Examiner* — Andrew B Whitaker
(74) *Attorney, Agent, or Firm* — Blank Rome LLP

(57) ABSTRACT

A method to provide information about media products available through a media distribution platform enables users of the media distribution platform to communicate information about media products via social network messages. Upon selection of an option by a user to communicate information about a media product via a social network message, the media distribution platform generates a pre-filled social network message that includes an identifier of the media product. In addition to allowing information about media products to be communicated via the social network, the media product identifier also enables the media distribution platform to retrieve information about a media product's popularity as indicated by the number of social network messages that include the identifier. This information can be utilized to enhance and personalize user media product recommendations through the media distribution platform.

21 Claims, 8 Drawing Sheets

(56) References Cited

U.S. PATENT DOCUMENTS

| | | | | |
|---|---|---|---|---|
| 2009/0055292 | A1* | 2/2009 | Chong et al. | 705/27 |
| 2009/0144392 | A1* | 6/2009 | Wang | G06Q 10/10 709/217 |
| 2010/0332283 | A1* | 12/2010 | Ng et al. | 705/9 |
| 2012/0109771 | A1* | 5/2012 | Zargahi | 705/26.3 |
| 2012/0116905 | A1* | 5/2012 | Futty et al. | 705/26.1 |
| 2012/0151359 | A1* | 6/2012 | Mysen | G06F 11/3438 715/736 |
| 2012/0233020 | A1* | 9/2012 | Eberstadt | G06Q 10/10 705/26.41 |
| 2012/0254060 | A1* | 10/2012 | Choudhary | G06Q 30/00 705/347 |
| 2012/0290605 | A1* | 11/2012 | Ickman | G06F 17/30867 707/769 |

FOREIGN PATENT DOCUMENTS

| | | |
|---|---|---|
| CN | 102077240 A | 5/2011 |
| CN | 102460500 A | 5/2012 |
| KR | 1020110038640 | 4/2011 |
| KR | 1020120009843 | 2/2012 |

OTHER PUBLICATIONS

Fujiki, Identification of Bursts in a Document Stream, IPSJ SIG Technical Report, Mar. 5, 2004, vol. 2004, No. 23, pp. 85-92.

\* cited by examiner

PROVIDING FEEDBACK VIA A SOCIAL NETWORK FROM A MEDIA DISTRIBUTION PLATFORM

BACKGROUND

This disclosure relates generally to the integration of social networking with a media distribution platform. More specifically, but not by way of limitation, this disclosure relates to a system and method for allowing consumers to provide feedback about a media product from a media distribution platform via the user's social network account.

With increases in processing power and connectivity of mobile devices, there has been a significant increase in the digital media available for usage on these devices. Examples of such digital media include audio data, video data, and software applications (e.g., social networking applications, banking applications, video game applications, etc.). Oftentimes, digital media are obtained electronically from a media distribution platform. One example of a media distribution platform is the Apple® App Store™. (APPLE is a registered trademark of Apple Inc. APP STORE is a trademark of Apple Inc.)

Based on the vast number of digital media products available through various media distribution platforms, there exists a need to enable users to identify media products that are of interest to them. Currently, media distribution platforms provide functionality for users to rate media products. These user ratings are utilized to rank the popularity of media products that are available through a media distribution platform. While these rankings may indicate a media product's global popularity, such rankings are not customized to the individual preferences of a user. Media distribution applications may also customize media product recommendations based on media products that the user already has, a user's rankings of media products produced by a certain developer, etc. It would be beneficial to utilize social networking communications to increase the availability of media product information.

SUMMARY

In one embodiment, a method and computer program product include querying a server-side social network application, by a media distribution platform, to determine a number of occurrences of a media product identifier in social network messages where the media product identifier is included in social network messages originally generated through the media distribution platform. Based at least in part on the number of occurrences of the media product identifier in the social network messages, the media distribution platform generates statistics related to a media product and creates a media product rating based at least in part on the statistics.

In another embodiment, a program storage device includes instructions to cause a processor to display a media product listing and a share selector. In response to a selection of the share selector, an identifier of one or more social networks is displayed. Based on a selection of at least one of the social networks, a social network message relating to the product listing is obtained and displayed. The social network message can then be transmitted to the selected social network(s) based on a selection of a transmit input from the displayed message.

DETAILED DESCRIPTION

This disclosure pertains to systems and methods to integrate the functionality of a social network with a media distribution platform. In general, techniques are disclosed for enabling a user to comment on a media product from a media distribution platform using a social network account. More particularly, a media distribution platform can generate a pre-filled message with a media product identifier to be communicated as a social network message via a user's social network identity (i.e., a social network identity associated with the user's social network account).

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of media distribution platforms having the benefit of this disclosure.

Figure 1:
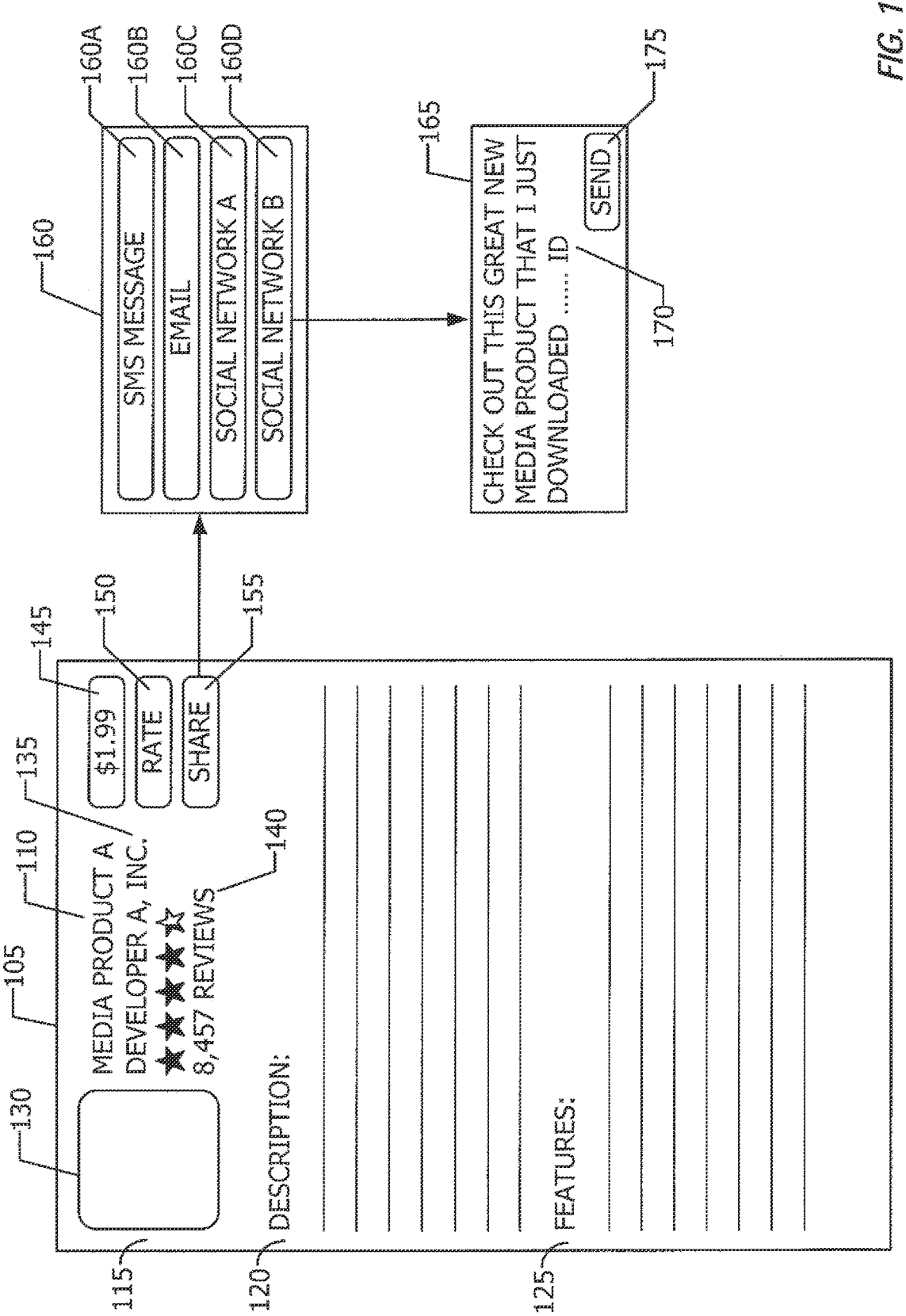
FIG. 1 is an example user interface for a media distribution platform illustrating the ability to communicate information about a media product via a social network in accordance with one embodiment.

Referring to FIG. 1, an example user interface illustrates the inclusion of social network functionality within a media distribution platform. As used herein, a media distribution platform refers generally to a service that allows users to electronically search for and obtain media products. The functionality of a media distribution platform may typically be divided between a client-side media distribution application that executes on a user's device and a server-side media distribution application. Within a media distribution platform, media product display 105 can include information about a specific media product 110, which may be described as a media product listing. Media product 110 may be audio media, video media, a mobile application, or any other form of digital media that is obtainable through the media distribution platform. The media distribution platform may provide a separate media product display for each media product available for retrieval through the distribution platform. Alternatively, the media distribution platform may provide a single media product display for multiple available media products. A user may arrive at media product display 105 in a variety of manners. For example, when launched, a media distribution platform may provide a home display. The home display may allow a consumer to browse for a particular media product by category (e.g., games, productivity, sports), by browsing a list of the most popular media products, by searching for a media product name or developer name, etc. In the illustrated embodiment, media product display 105 is divided into an interaction section 115, a description section 120, and a features section 125. Description section 120 may provide a description of media product 110 and may contain marketing information such as quotes from a newspaper or magazine review of media product 110. Features section 125 may identify the features of a device that are required to use the media product. For example, features section 125 may indicate that media product 110 is compatible with certain devices but incompatible with certain other devices. Finally, interaction section 115 identifies media product 110 and allows a user to take certain actions with respect to media product 110. Interaction section 115 may contain an icon 130 that identifies media product 110, the name of media product 110, a developer or artist 135 that created media product 110, and rating information 140 for media product 110.

Purchase selector 145 allows a user to obtain media product 110 (e.g., download media product 110 from the media distribution platform to the user's device). In one embodiment, the media distribution platform stores user account information (e.g., credit card information) and charges the user the appropriate fee when the user selects purchase selector 145. Feedback selector 150 allows a user to rate media product 110. For example, after a user obtains media product 110, the user may return to media product display 105 to provide feedback regarding media product 110. In one embodiment, feedback selector 150 may cause the display of an interface that allows the user to rate media product 110 according to a scale (e.g., 1 to 5 stars). The user's feedback may become part of rating information 140 for media product 110. Rating information 140 allows users of the media distribution platform to sort media products by popularity and to find media products in which they may be interested.

In one embodiment, selection of share selector 155 causes the display of a list of distribution channels 160 by which information about media product 110 can be shared. In the depicted embodiment, available distribution channels include SMS message 160A, email 160B, social network A 160C, and social network B 160D. The depicted list of distribution channels 160 is provided as an example and is not intended to be limiting in any manner. As described in greater detail below, share selector 155 may also be available from different interfaces of the media distribution platform (i.e., not necessarily from media product display 105). Distribution channels 160C and 160D allow a user to share information about a media product through one or more of the user's social network accounts (i.e., social network accounts for social network A and social network B). Example social networks may include Facebook °, Twitter °, and LinkedIn®. (FACEBOOK is a registered trademark of Facebook, Inc. TWITTER is a registered trademark of Twitter, Inc. LINKEDIN is a registered trademark of LinkedIn Corporation.) Other social networks will also be known to those of skill in the art. In one embodiment, only the appropriate distribution channels will be selectable. For example, if a particular user has a social network A account but not a social network B account, the social network B distribution channel 160D may not be selectable or even displayed. In another embodiment, only those social network accounts that are configured on the device used to access the media distribution platform may be selectable. For example, if a user has a social network account that is not configured on the device used to access the media distribution platform, the corresponding social network distribution channel may not be selectable.

Selection of one of the social network distribution channels (160C/D) may cause the media distribution platform to generate a pre-filled message 165 to be sent via the user's social network identity for the selected social network (i.e., social network A or B). In one embodiment, pre-filled message 165 may be editable by the user. Pre-filled message 165 includes identifier 170 of media product 110 corresponding to media product display 105 from which pre-filled message 165 was generated. In one embodiment, if a social network message is communicated as a Twitter message, identifier 170 may be a Twitter hash tag. In another embodiment, identifier 170 may be a selectable link. In such an embodiment, the selectable link may be a uniform resource locator (URL). In yet another embodiment, the selectable link may cause the media distribution platform to be launched and media product display 105 to be displayed when selected from a device that has access to the media distribution platform (e.g., a device operated by a recipient of a generated social network message). In one embodiment, the selectable link may cause the display of a webpage that provides information about media product 110 when selected from a device that does not have access to the media distribution platform.

Message 165 may additionally include an identifier of the media distribution platform or the organization that controls the media distribution platform. Message 165 may also include an image or screenshot, such as, for example, an image or screenshot related to the media product. In one embodiment, the language of message 165 may be determined based on a setting of the device used to access the media distribution platform, a setting of the user's social network account, or a setting of the user's media distribution platform account.

Selection of send selector 175 may cause the communication of social network message 165 via the user's social network identity (i.e., the social network identity associated with the user's social network account). In one embodiment, the media distribution platform may communicate social network message 165 on behalf of the user (e.g., the message is sent from a server-side media distribution application to a server-side social network application). In another embodiment, social network message 165 may be communicated directly from the user's device (e.g., the message is sent from the user's device to a server-side social network application).

Figure 2:
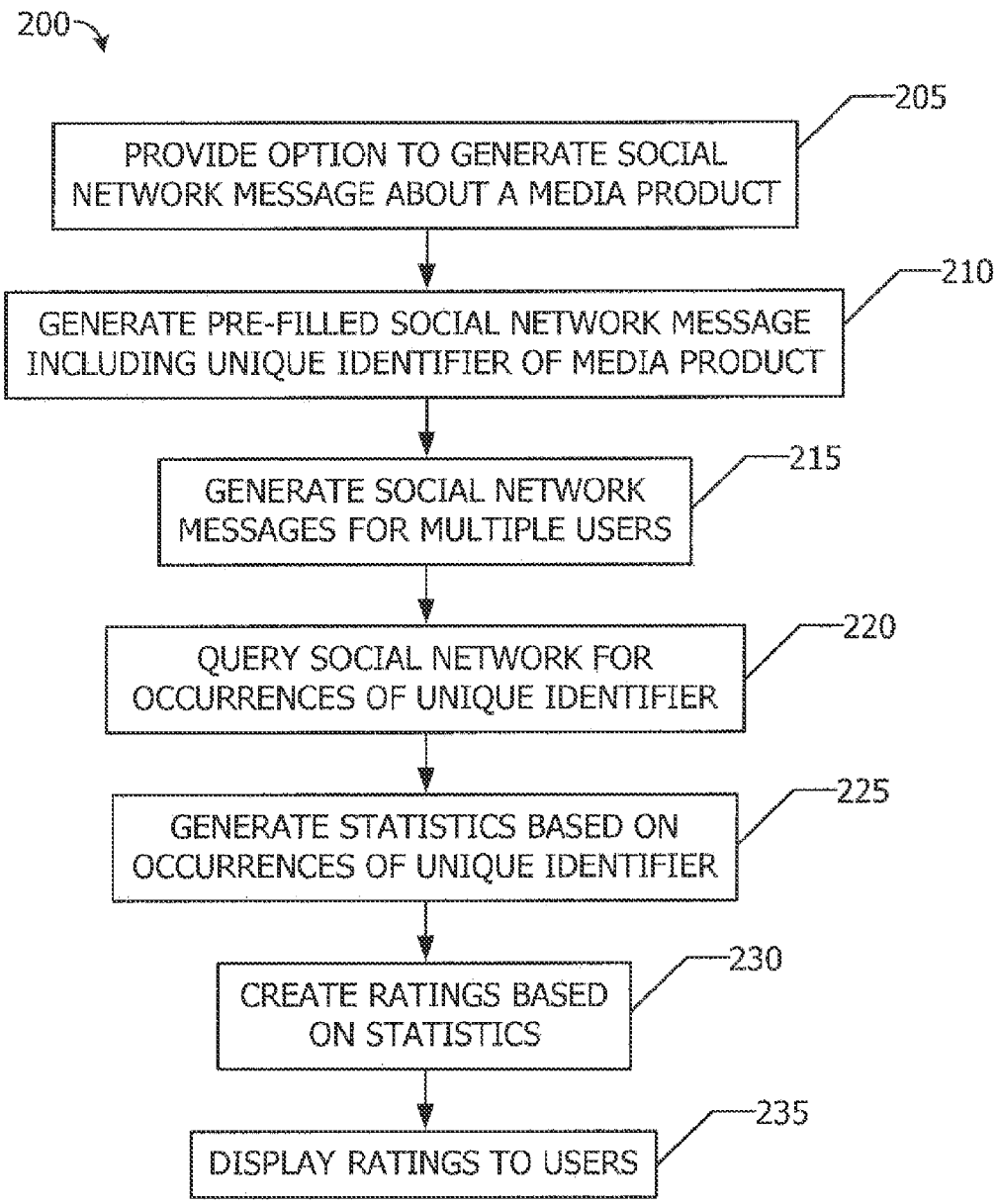
FIG. 2 is a flowchart illustrating a process by which a media distribution platform enables a user to communicate information about a media product and retrieves social network information about the media product to create media product ratings in accordance with one embodiment.

Referring to FIG. 2, media distribution platform operation 200 provides an option to generate a social network message about a media product offered through the media distribution platform (block 205). In one embodiment, the option to generate the social network message may be provided as a selectable link from an interface of the media distribution platform. In another embodiment, the option to generate the social network message may be provided from a media product display of the media distribution platform. In yet another embodiment, the option to generate the social network message may be provided from an interface that allows a user to rate a media product that is available through the media distribution platform. In still another embodiment, the option to generate the social network message may be provided after a user obtains the media product. For example, the option may be provided through a media distribution platform display that is shown after a user purchases a media product.

When a user selects the option to generate a social network message about a media product through the media distribution platform, the media distribution platform generates a pre-filled social network message that contains a unique identifier for the media product (block 210). In one embodiment, the text of the pre-filled message may be based on an interface of the media distribution platform from which the option was selected. For example, if the option is selected from a media product display, the media distribution platform may generate a generic message such as "Check out this media product." If the option is selected from an interface that allows a user to rate a media product, the pre-filled message may be tied to the user's rating of the media product. For example, such a message may say "I just rated this media product 4 stars out of 5." Likewise, if the option is selected from an interface that is shown after a user obtains a media product, the media distribution platform may generate a message such as "I just bought this media product." In one embodiment, the pre-filled message may be editable by a user. Each such message may include an identifier of the media product. In one embodiment, the user may be able to edit the text of the pre-filled message but may not be able to remove the identifier of the media product from the pre-filled message. In another embodiment, the identifier may be a selectable link. As noted above, the selectable link may cause a device from which the link is selected (e.g., a device operated by a recipient of a generated social network message) to launch the media distribution platform and to display information associated with the media product. In one embodiment, the identifier may be based on the interface from which the option to generate the social network message about the media product was selected (i.e., by the user sending the product information message). Therefore, like the text of the pre-filled message, the identifier may be dependent upon the circumstances that led to the generation of the pre-filled message. As such, even though multiple identifiers may uniquely identify a particular media product, each may provide additional information. For example, like the text of the pre-filled message, an identifier may indicate a rating that a user assigned to a media product. Likewise, the identifier may indicate that a user actually purchased or otherwise retrieved the media product. Typically, the context of the identifier (e.g., whether the identifier is associated with a positive review of a media product or a negative review of a media product) will not be apparent to a recipient of the message based on the identifier alone.

Over time, social network messages may be generated by multiple users about a common media product (block 215). These messages may originally be communicated to the social network as the pre-filled message generated through the media distribution platform. However, the messages may be subsequently transmitted through the social network by other social network users. For example, a social network friend of a user that causes a pre-filled message to be generated by the media distribution platform may comment on, re-transmit, or otherwise cause additional social network interaction with the pre-filled message. Therefore, the provision of an interface to generate a social network message through a media distribution platform may allow information about media products available through the media distribution platform to be proliferated via the social network. Moreover, each of the social network communications may contain or be traceable to the identifier contained in the original social network message. As such, information about a media product's popularity can be gleaned from social network communications about the media product.

The volume of information pertaining to a media product that is being communicated via a social network can be measured by querying the social network for occurrences of the identifier (block 220). In one embodiment, a server-side media distribution application may query a server-side social network application to identify a number of occurrences of the media product identifier in social network messages. The query may, for example, seek to identify any occurrence of the identifier in any public message communicated via the social network over a certain time period. In another embodiment, the query may utilize a user's (e.g., a user interested in potentially obtaining the media product through the media distribution platform) social network credentials to identify occurrences of the identifier within private messages communicated by one or more people having a social network relationship with the user (e.g., messages sent by social network friends of the user or by people that the user follows on a social network). In one embodiment, the query may also identify certain text strings within messages bearing the identifier. For example, a message containing phrases such as "buy" or "great" may be indicative of positive feedback with respect to the media product. On the other hand, a message containing phrases such as "terrible" or "waste" may be indicative of negative feedback with respect to the media product. In another embodiment, the query may distinguish between different identifiers of the same media product. As noted above, the identifier may be based on the circumstances that led to the generation of the pre-filled message (e.g., a user's rating of the media product). Therefore, like the text of an identified message, the identifier itself may be associated with positive media product feedback or negative media product feedback.

Based on the occurrences of the identifier, the media distribution platform may generate statistics about a media product (block 225). In one embodiment, the generation of statistics about the media product may incorporate the above-described textual awareness and distinction between identifiers. The statistical generation may also resolve discrepancies between, for example, a positive text feedback with a negative identifier. This situation may occur when a first user generates a social network message through the media distribution platform by giving a media product a poor rating. The identifier in such a message may indicate negative feedback. A recipient of the social network message (e.g., a social network friend of the first user), however, may comment on or re-transmit the message that includes the identifier with text that reads "I love that media product." Although each social network occurrence will include the identifier that is indicative of negative feedback, the second message should be associated with positive feedback. The statistical generation step (block 225) may therefore resolve the discrepancy. The statistical generation step may also involve the assignment of different weights to different occurrences of an identifier. For example, more weight may be assigned to a social network message generated by a user that can be verified as having actually obtained the media product (e.g., where the identifier indicates that a user actually obtained the media product). Likewise, more weight may be assigned to an original message generated through the media distribution platform than for a message that is re-transmitted or comments on the original message.

The statistical generation step (block 225) may also consider the social network properties of a user that is interested in obtaining a media product through the media distribution platform. If the query evaluates private social network messages to obtain information that is specific to a particular user, it may be necessary to obtain additional social network information about the user. For example, if the results of a query indicate that a media product identifier is present in 15 messages associated with people in a social network relationship with a user, different statistics may be generated for a user that has 30 social network relationships from that of a user that has 1,500 social network relationships.

The generated statistics may be utilized to create media product ratings provided through the media distribution platform (block 230). In one embodiment, statistics generated based on publically available social network messages may be used to create global ratings. For example, a large volume of social network messages including positive feedback about a media product may increase a media product's rating in the media distribution platform. Likewise, a large volume of messages including negative feedback about a media product may decrease a media product's rating in the media distribution platform. In another embodiment, statistics generated based on private messages related to a particular user may be used to customize a rating of a media product as to the particular user. For example, a rating of a media product may be influenced by a statistic that indicates that a large proportion of people in a social network relationship with a user considering obtaining the media product have provided positive feedback about the media product. Therefore, while a particular media product may have a global rating, the rating displayed to a particular user may be adjusted based on the generated personal statistics. The ratings that are created based on the generated statistics can be displayed to a user of the media distribution platform in a variety of manners to provide information and guide the user to media products in which they may be interested (block 235). Thus, ratings and recommendations provided by a media distribution platform may be enhanced based on the identification of social network communications related to media products.

Figure 3:
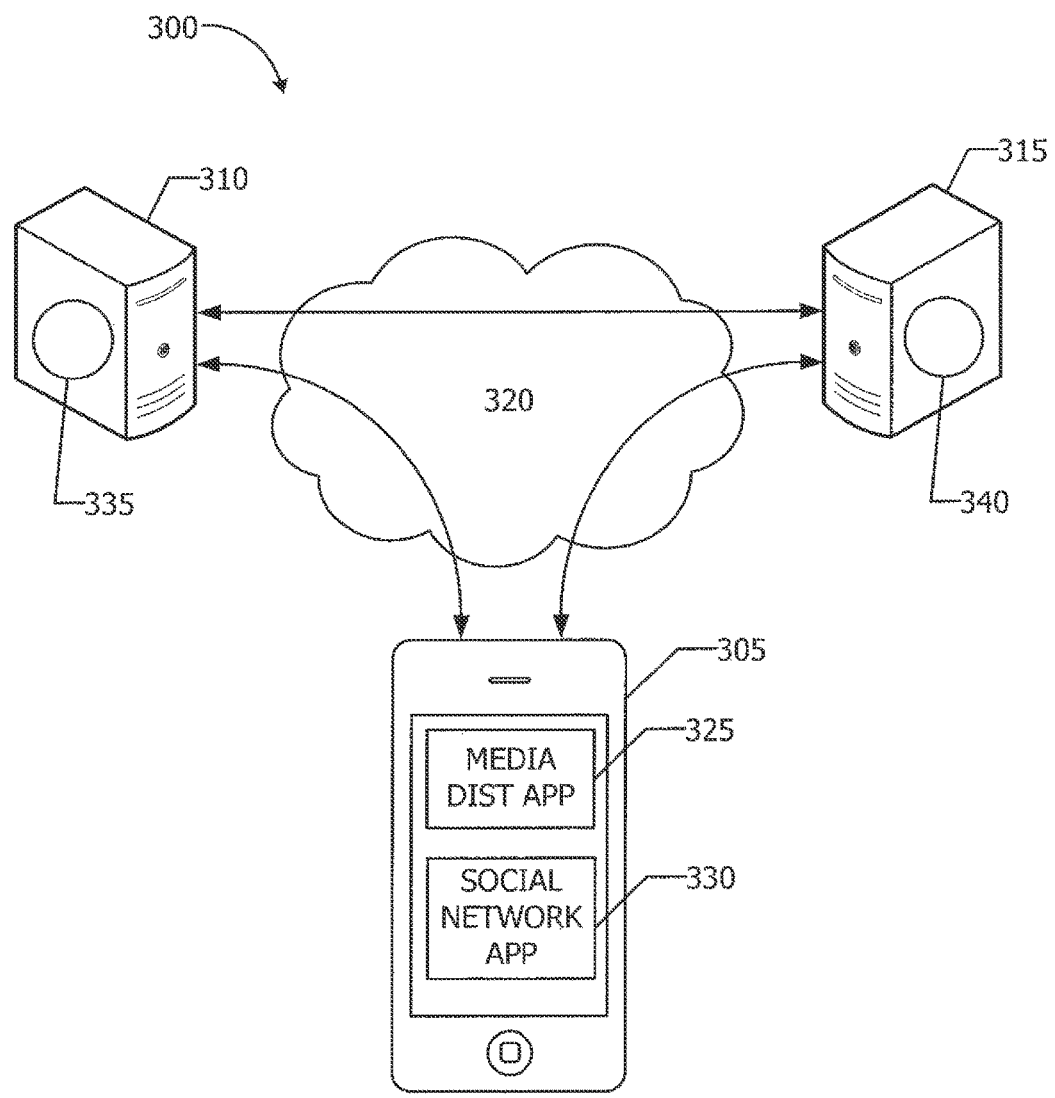
FIG. 3 is a block diagram illustrating the various components involved in the communication of social network messages through a media distribution platform in accordance with one embodiment.

Referring to FIG. 3, system 300 illustrates various components that may be involved in the communication of social network messages via a media distribution platform in accordance with this disclosure. In the illustrated embodiment, multifunction device 305 communicates with media distribution server 310 and social network server 315 via network 320. Likewise, media distribution server 310 and social network server 315 may also communicate via network 320. By way of example, device 305 may be a personal digital assistant (PDA), personal music player, mobile telephone, or a notebook, laptop or tablet computer system and is described in greater detail below with respect to FIG. 6. Media distribution server 310 and social network server 315 may be a laptop computer, desktop computer, or a server computer and are also described in greater detail below with respect to FIG. 6. Network 320 may take any form including, but not limited to, a local area network (LAN), a wide area network (WAN) such as the Internet or a combination of local- and wide-area networks. Further, network 320 may use any desired technology (wired, wireless or a combination thereof) and protocol (e.g., transmission control protocol, TCP). Although each of multifunction device 305, media distribution server 310, and social network server 315 are depicted as communicating over the same network 320, in an alternate embodiment, communications between the various devices may be over separate networks. In the illustrated embodiment, multifunction device 305 has installed thereon client-side media distribution application 325 and client-side social network application 330. Media distribution server 310 hosts server-side media distribution application 335 while social network server hosts server-side social network application 340. In the illustrated embodiment, client-side media distribution application 325 and server-side media distribution application 335 form a media distribution platform that allows a user of device 305 to search for and obtain media products. Likewise, client-side social network application 330 and server-side social network application 340 form a social network platform that allows a user of device 305 to communicate using a social network identity. As illustrated, the integration of social network functionality allows information about media products available through a media distribution platform to be communicated to and retrieved from a social network.

Figure 4A:
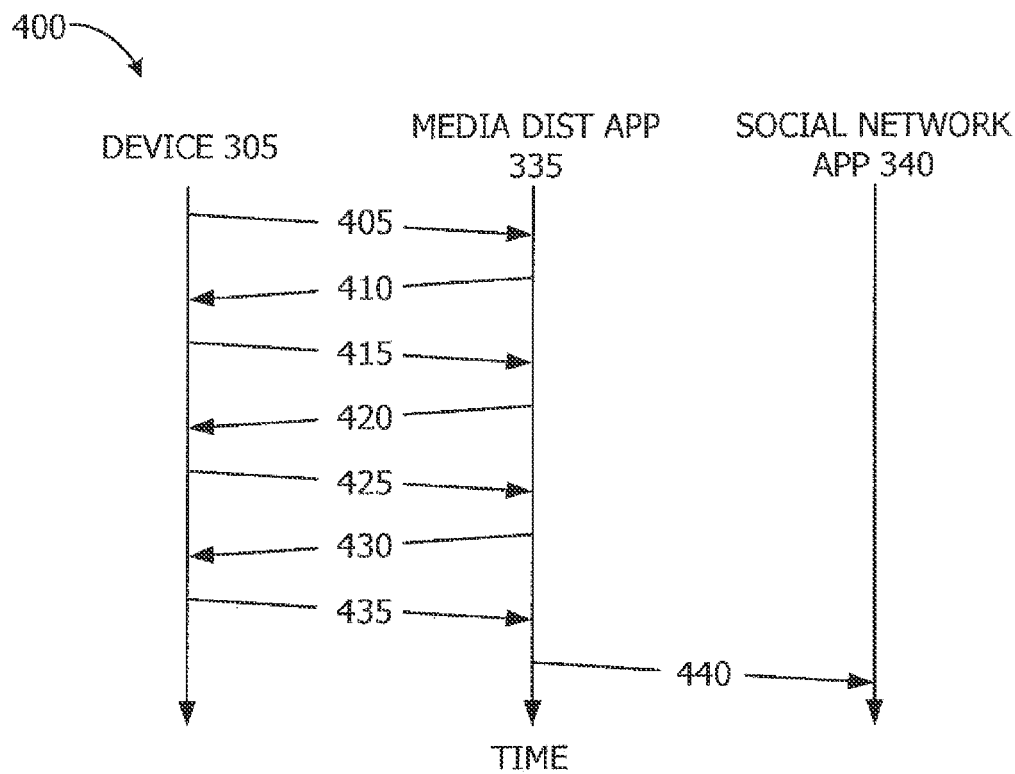
FIG. 4A is a communication flow diagram illustrating the flow of information between the components of FIG. 3 in communicating a social network message through a media distribution platform in accordance with one embodiment.

Referring to FIG. 4A, process 400 illustrates the interaction between device 305, server-side media distribution application 335 and server-side social network application 340 in generating a social network message through a media distribution platform. A user of device 305 browses through media products available through the media distribution platform. In one embodiment, the user of device 305 may browse for media products by launching client-side media distribution application 325 on device 305. Device 305 can then send request 405 to server-side media distribution application 335 to perform a certain action. In one embodiment, request 405 may identify a particular media product display that should be returned. In another embodiment, request 405 may identify a media product that the user wants to rate. In still another embodiment, request 405 may identify a media product that the user wants to purchase.

Upon receiving request 405, server-side media distribution application 335 returns the appropriate interface 410. The provided interface may include an option to comment on the media product through a social network. Upon viewing the provided interface, the user of device 305 may select to comment on the media product by selecting the social network option. Selection of the social network option by the user may cause device 305 to generate request 415 to communicate about the media product using a social network identity of the user.

Upon receiving request 415, server-side media distribution application 335 may request the social network credentials of the user 420. In the illustrated embodiment, server-side media distribution application 335 communicates the social network message on behalf of the user. Therefore, server-side media distribution application 335 must first obtain the user's social network credentials such that the social network message can be attributed to the user's social network identity. In one embodiment, the social network credentials may be a username and password combination. In another embodiment, the credentials may be a pre-established token that identifies the user and allows a device that presents the token to communicate via the social network using the social network identity of the user. In still another embodiment, the user's social network credentials may be stored at media distribution server 310 such that they need not be obtained from device 305.

In an alternate embodiment, the social network message may not be transmitted by server-side media distribution application 335 but may instead be transmitted directly from device 305. In such an embodiment, server-side media distribution application 335, upon receiving request 415, may, rather than requesting the user's social network credentials, send a pre-filled social network message to device 305 to be communicated directly from device 305 to server-side social network application 340. Therefore, it may not be necessary for server-side media distribution application 335 to obtain the user's social network credentials.

Based on request 420, device 305 may transmit 425 the requested credentials to server-side media distribution application 335. In one embodiment, the credentials may be communicated in an encrypted form. In one embodiment, request 420 and reply 425 may be transparent to the user of device 305. That is, device 305 may store the user's social network credentials and may automatically reply to server-side media distribution application 335's request for the social network credentials.

When server-side media distribution application 335 receives the user's social network credentials, a pre-filled social network message including an identifier of the media product may be created. As set forth above, both the text of the pre-filled message as well as the product identifier may be based on the circumstances that led to the generation of the pre-filled message. The pre-filled social network message may then be communicated 430 to device 305 for display to the user of the device. In one embodiment, the pre-filled social network message is displayed in a manner that allows the user to edit the text of the message. A request 435 to communicate the message via the user's social network identity can be sent along with any message edits to server-side media distribution application 335. In one embodiment, request 435 may identify a sub-group of a social network to which the message should be transmitted. For example, if the social network platform on which the message will be communicated allows a user to establish sub-groups of friends, the user may identify one of the pre-established sub-groups to which the message should be communicated (e.g., work friends, family, etc.). Upon receiving request 435, server-side media distribution application 335 transmits 440 the message to server-side social network application 340 along with the user's social network credentials. As such, the message about the media product is communicated via the social network using the user's social network identity.

Figure 4B:
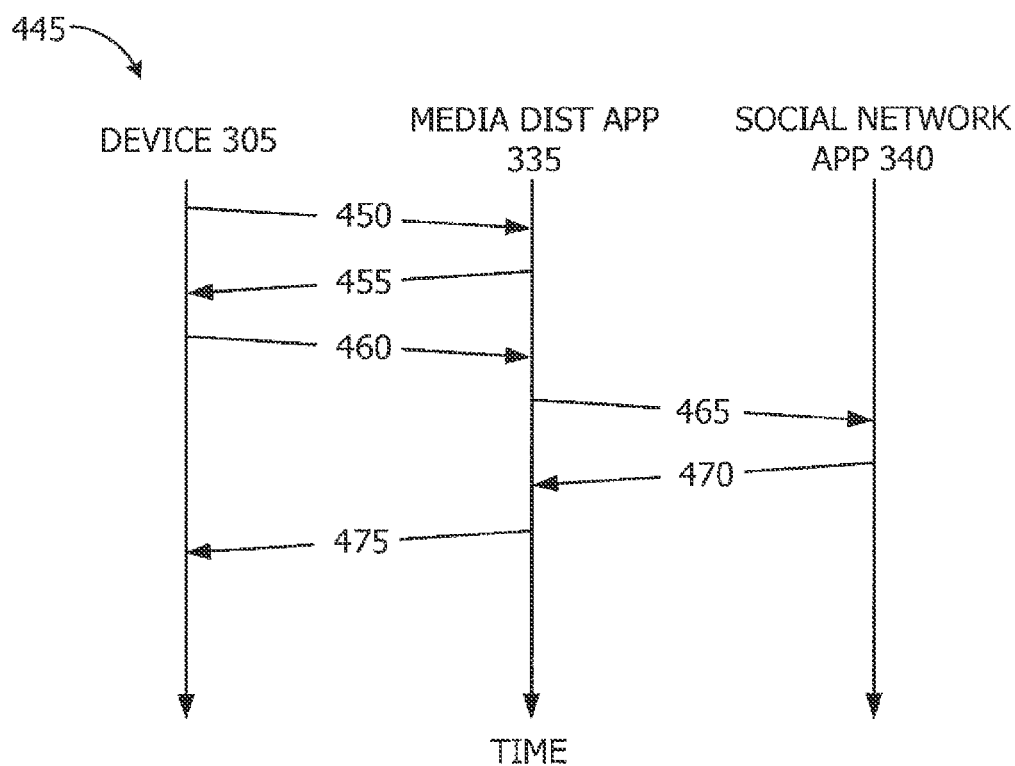
FIG. 4B is a communication flow diagram illustrating the flow of information between the components of FIG. 3 in retrieving media product information contained in social network messages in accordance with one embodiment.

Referring to FIG. 4B, process 445 illustrates another interaction between device 305, server-side media distribution application 335 and server-side social network application 340 to generate a media product recommendation through a media distribution platform. Just as in FIG. 4A, a user of device 305 can browse through media products available through the media distribution platform. In the illustrated embodiment, device 305 sends request 450 to server-side media distribution application 335 to perform a certain action. In one embodiment, request 450 may identify a particular category of media products that the user of device 305 would like to view. In another embodiment, request 450 may identify a specific media product in which the user of device 305 is interested. Upon receiving request 450, server-side media distribution application 335 identifies that a response to request 450 can be customized according to social network information related to the user's social network identity. Accordingly, server-side media distribution application 335 may request 455 the user's social network credentials and the credentials may be provided 460 from device 305. The request for and communication of the user's social network credentials may occur in the same manner as described above with respect to FIG. 4A (e.g., items 420 and 425).

Upon receiving the user's social network credentials, server-side media distribution application 335 may send 465 a query to social network application 340 that includes the user's social network credentials. Inclusion of the user's social network credentials may allow the query to obtain information contained in private messages communicated by social network users in a social network relationship with the user. In one embodiment, the query may be based on request 450. For example, if request 450 identifies a specific category of media products that the user is interested in, the query may seek to identify all occurrences of media product identifiers related to the requested category in social network messages that have been communicated by people having a social network relationship with the user. Similarly, if request 450 identifies a particular media product, the query may seek to identify all occurrences of identifiers associated with the particular media product in social network messages that have been communicated by people having a social network relationship with the user.

Server-side social network application 340 may reply 470 to request 465 with the results of the query. As described above with respect to FIG. 3, server-side media distribution application 335 may utilize the query results to generate statistics that influence media product recommendations. The media product recommendations may then be used to create a customized response 475 to request 450.

It should be noted that the process described in FIG. 4B creates a customized response 475 to a particular user. This occurs in addition to the information that can be gleaned from publically available social network messages. That is, information in publically available social network messages may be continuously gathered by server-side media distribution application 335 as such information does not require a user's social network credentials. The obtained information may be used to globally supplement the ratings information for media products provided through the media distribution platform. The combined recommendations based on ratings information and publically available social network information may be further supplemented by user-specific social network information about media products as illustrated in FIG. 4B. As illustrated in FIGS. 4A and 4B, the integration of social network functionality through a media distribution platform enables valuable information to be distributed through, and retrieved from, a social network.

Figure 5A:
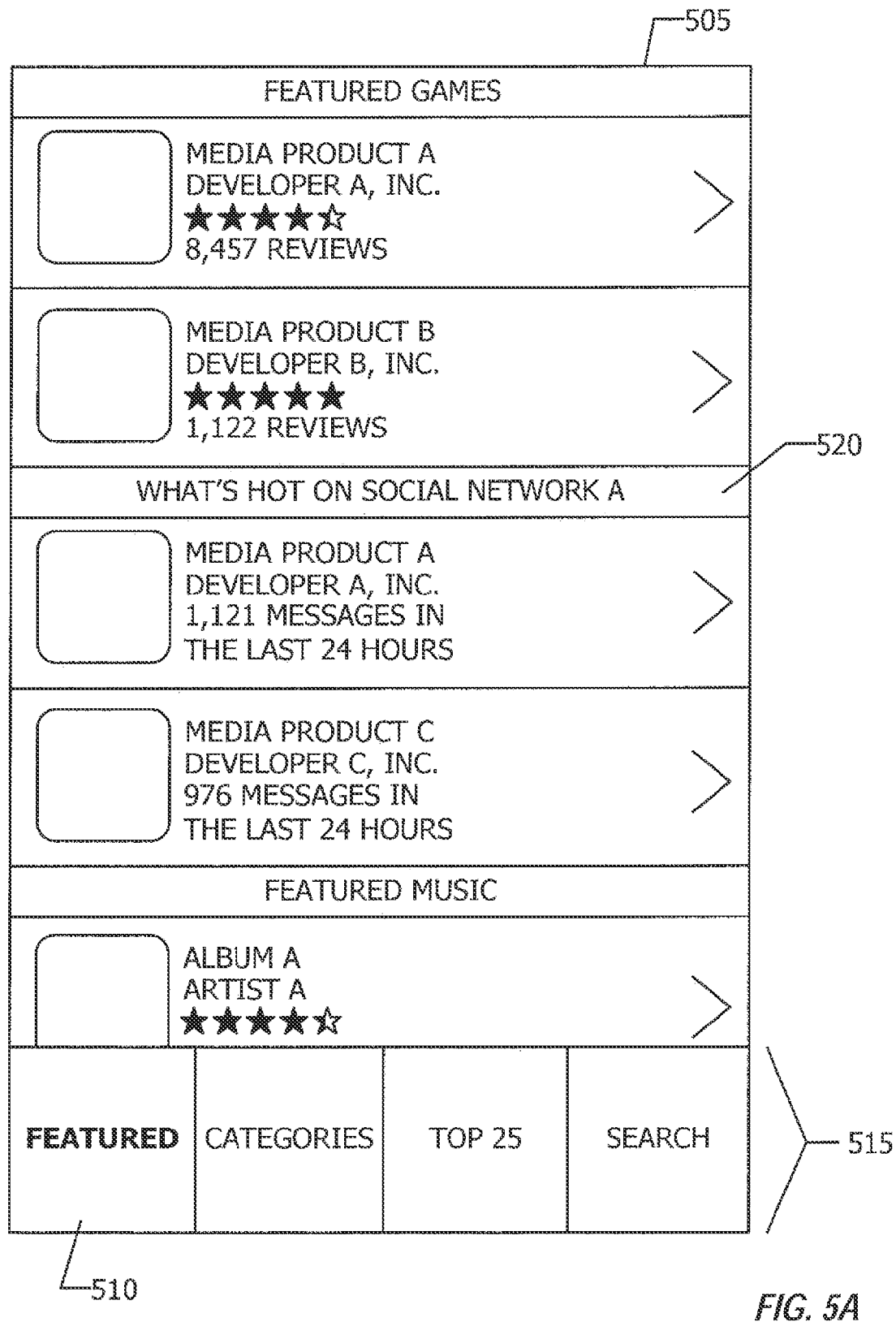
FIGS. 5A-5C illustrate example media distribution platform user interfaces that incorporate media product information obtained from social network communications in accordance with one or more embodiments.
Figure 5B:
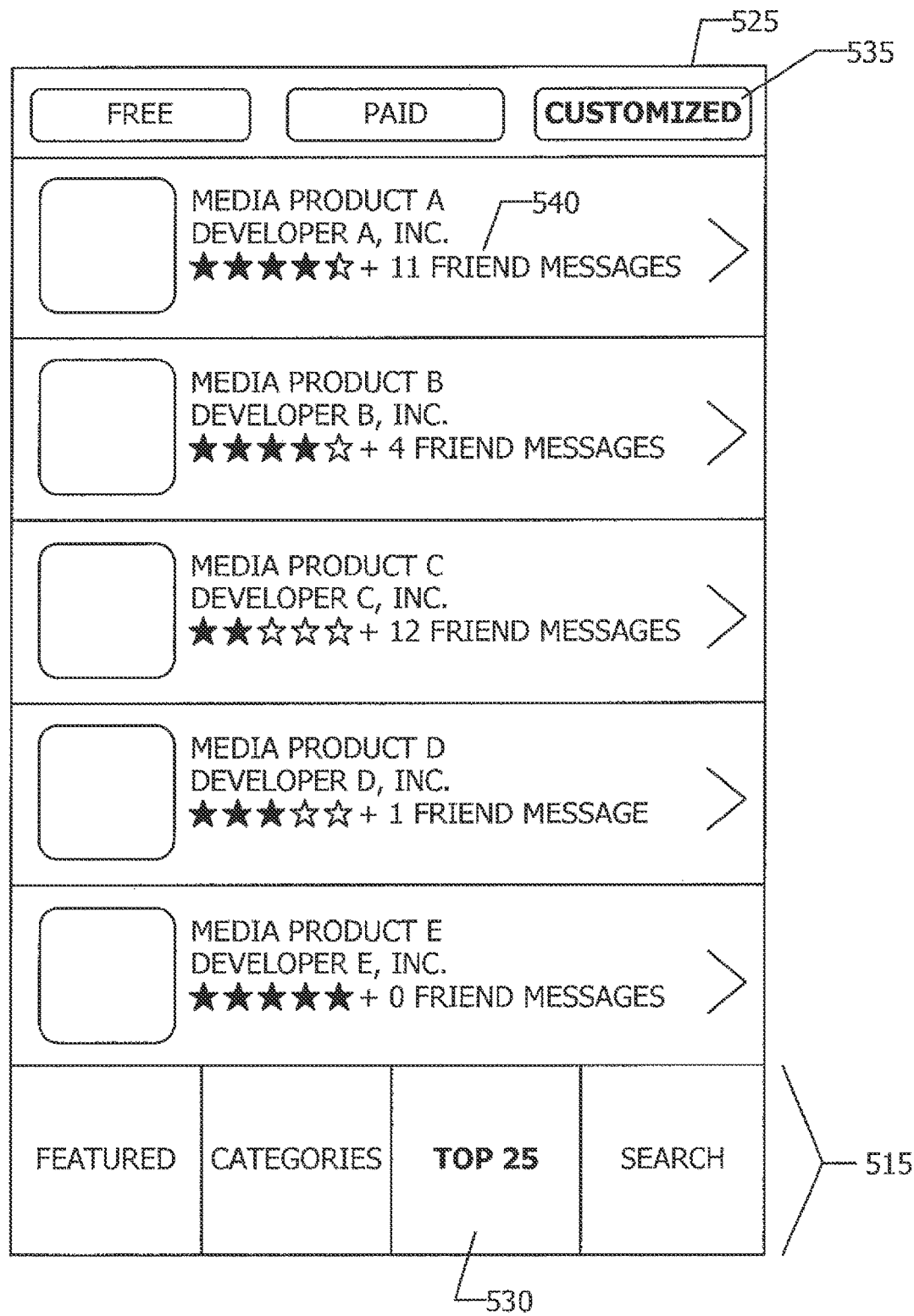
Figure 5C:
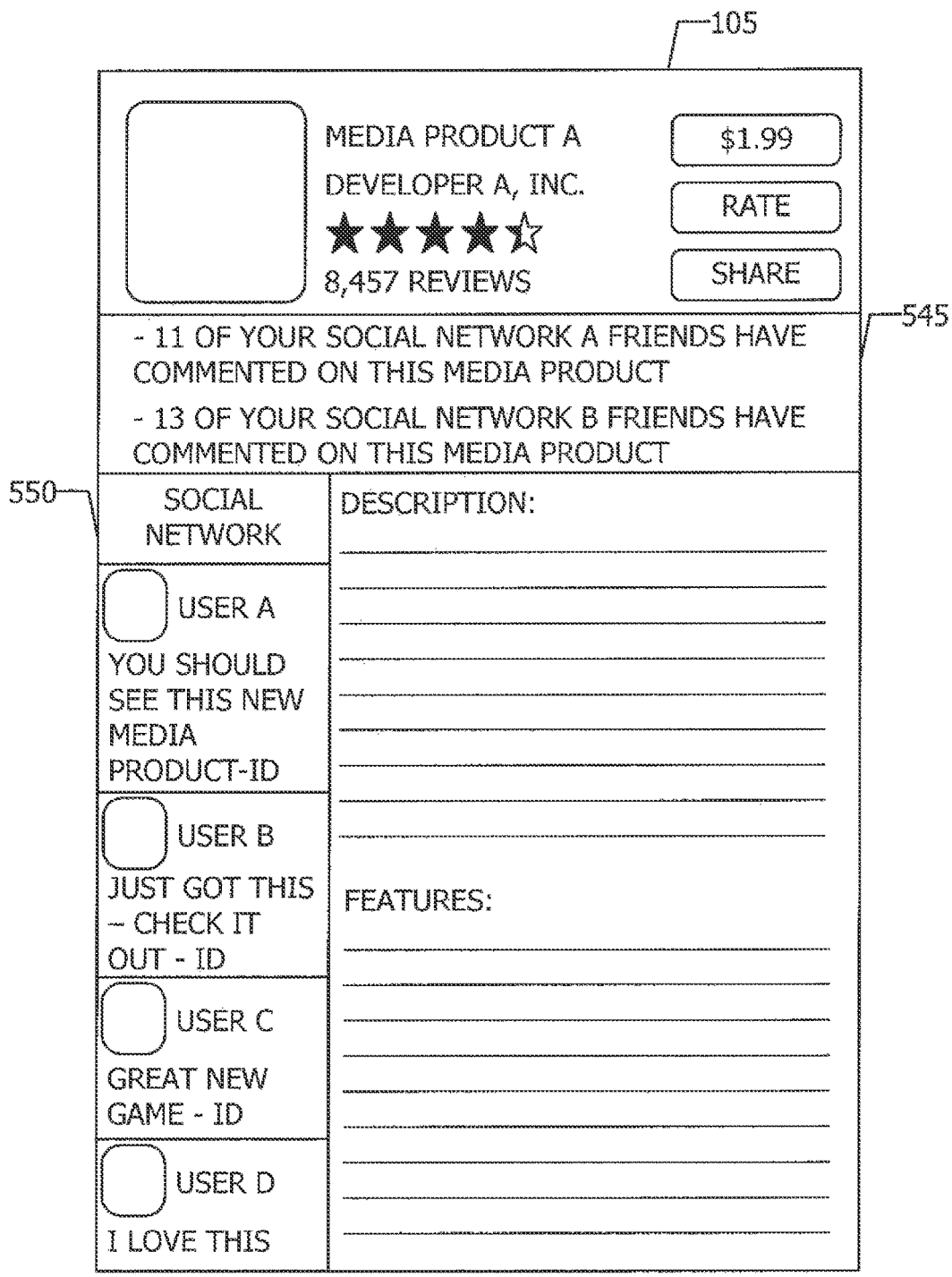

FIGS. 5A-5C provide example media distribution platform interfaces that illustrate some of the ways in which the integration of social network functionality can improve the media distribution platform experience. Referring first to FIG. 5A, an example media distribution platform interface 505 illustrates the display of featured media products. In one embodiment, a user of the media distribution platform may arrive at interface 505 by selecting a "FEATURED" icon 510 from a media distribution platform navigation bar 515. Interface 505 may display various categories of featured media products such as featured games, music, video, audio texts, and applications. The media products displayed in these sections may be based on user ratings of media products in these categories. Most interestingly in terms of the present disclosure, interface 505 may additionally include a section 520 for media products that are popular on one or more social networks. The media products displayed in this section may be determined based on the number of occurrences of identifiers of the media product in messages communicated via one or more social networks over a certain time period. In one embodiment, server-side media distribution application 335 may filter on messages that are identified as containing positive feedback such that a media product with a large amount of negative feedback on the social network does not become a featured media product as listed in section 520. In one embodiment, the media products listed in section 520 may be determined entirely based on information obtained from social network messages. In another embodiment, the media products in section 520 may be based on ratings of the media products through the media distribution platform as supplemented by information obtained from social network messages. In one embodiment, the information obtained from social network messages may be based on information contained in publically available social network messages. In another embodiment, the information obtained from social network messages may be based on both public and private social network messages. As used here, the term "private" refers to information obtained from a social network account of a specific user. The number of occurrences of media product identifiers in private social network messages may be saved by server-side media distribution application 335 based on customized recommendations performed for users. As illustrated, the integration of social network functionality through a media distribution platform may enable the creation of a category of media products based on popularity of the media products in a social network.

Referring to FIG. 5B, an example media distribution platform interface 525 illustrates the display of ranked media products. In one embodiment, a user of the media distribution platform may arrive at interface 525 by selecting a "TOP 25" icon 530 from a media distribution platform navigation bar 515. Interface 525 may display the top ranked media products for various categories. In the illustrated embodiment, a user may view the top ranked free media products or the top ranked paid media products. In another embodiment a user may be able to view top ranked media products by categories such as games, productivity, travel, etc. The rankings in these categories may be based on the ratings of media products through the media distribution platform. Therefore, a media product in a particular category having the highest rating based on user reviews may be displayed at the top of interface 525 for the particular category.

Interestingly in terms of the present disclosure, interface 525 may include customized selector 535 that allows a user to view the top rated media products as customized for the user. Media products that appear when the customized selector 535 is chosen may be determined based on information contained in private social network messages communicated by the user and other users in a social network relationship with the user. Information obtained from private social network messages (as set forth with respect to FIG. 4B) may be utilized to supplement the user ratings provided through the media distribution platform to obtain customized ratings. Therefore, the media products listed in customized interface 525 for one user may differ from those listed for another user. Customized interface 525 may also display the number of social network messages 540 about a particular media product that have been communicated by people in a social network relationship with the user. In one embodiment, the number of social network messages 540 may be a selectable link that allows a user to display the social network messages. The media products listed in the customized interface 525 may also be based on the user's own social network messages. For example, if a user sent positive feedback through a social network message about a media product created by a certain developer, other media products created by that developer may be displayed toward the top of the user's customized interface 525. As illustrated, the integration of social network functionality through a media distribution platform may allow for the customization of media product recommendations for a user based on private social network messages associated with the user.

Referring to FIG. 5C, a media product display 105 for a media distribution platform as described with respect to FIG. 1 includes information obtained based on the integration of social network functionality. Media product display 105 may include social network status section 545. Social network status section 545 provides the number of occurrences of an identifier of a media product associated with media product display 105 in social network messages communicated by people having a social network relationship with a user that browses to media product display 105. In the illustrated embodiment, social network status section 545 includes the number of the user's friends that have commented on the media product in each of the social networks that the user participates in (i.e., social network A and social network B). This particular embodiment of media product display 105 additionally includes a social network stream 550. Social network stream 550 may provide the most recent social network messages related to the media product associated with media product display 105. The messages included in social network stream 550 may be obtained from the server-side social network application in a similar manner to the number of occurrences of a media product identifier. For example, rather than querying the server-side social network application for a number of occurrences of a media product identifier, a query may request the actual content of the most recent messages that contain the identifier. In one embodiment, social network stream 550 may list the most recent publically available social network messages about the media product. In another embodiment, social network stream 550 may list private social network messages about the media product that are obtained through the user's social network account. Therefore, while a rating of a media product may be impacted by the social network messages of a user's social network friends, the user may evaluate the messages that contributed to the rating to determine the credibility of the messages. In another embodiment, social network stream 550 may display social network messages created by a social network account that is associated with the media product or a developer of the media product. Therefore, a developer may be able to quickly and easily communicate information through a media distribution platform through which a media product is offered based on the integration of social network functionality within the media distribution platform. In one embodiment, media product display 105 may provide a selector that allows a user to toggle social network stream 550 between public social network messages, private social network messages, and messages generated by a social network account that is associated with the media product or a developer of the media product. As illustrated, the integration of social network functionality through a media distribution platform may provide useful information to a user such that the user can evaluate a media product available through the media distribution platform.

Figure 6:
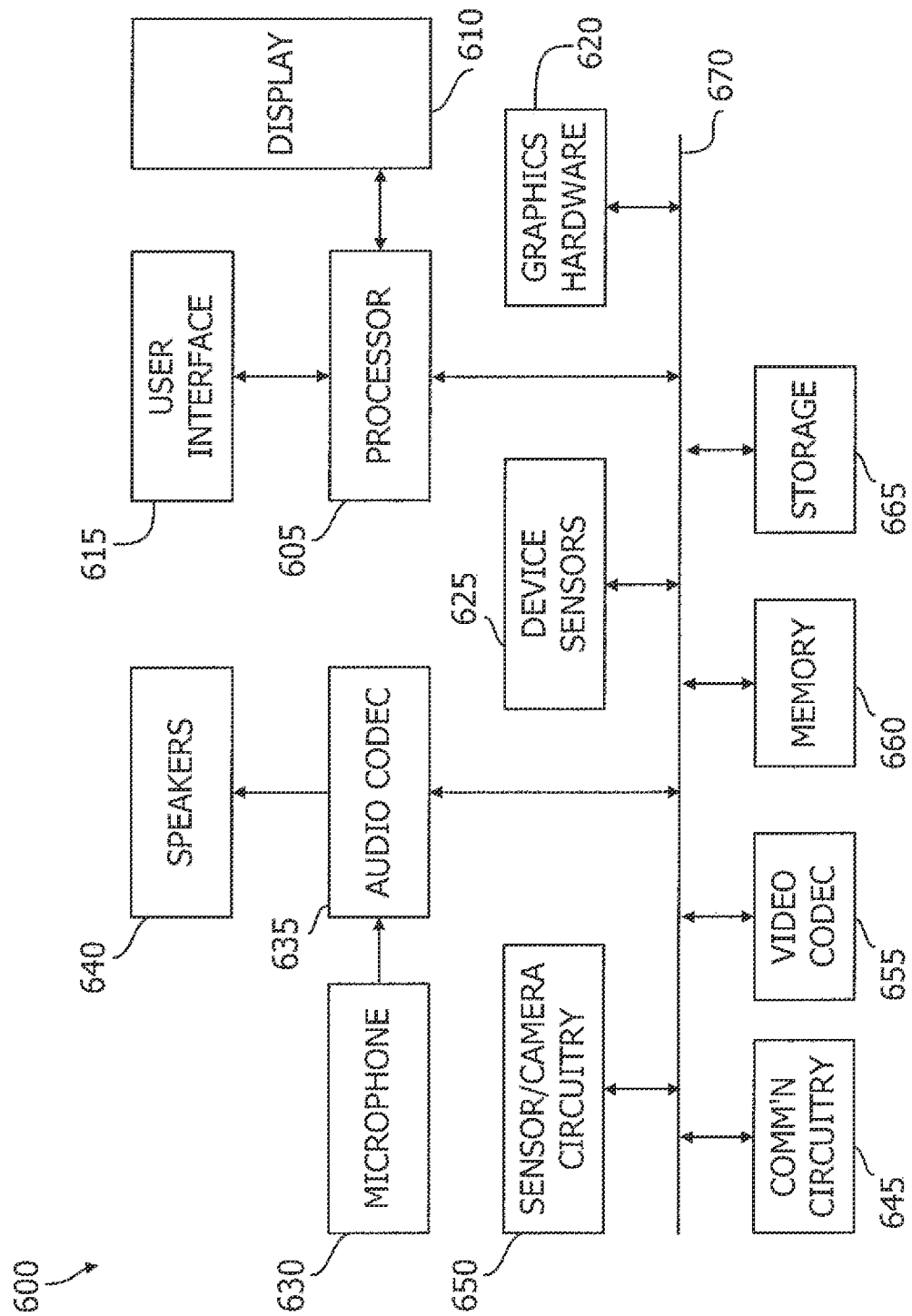
FIG. 6 is a block diagram illustrating an electronic device in accordance with one embodiment.

Referring to FIG. 6, a simplified functional block diagram of an illustrative electronic device 600 is shown according to one embodiment. Electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a personal digital assistant (PDA), personal music player, mobile telephone, notebook, laptop or a tablet computer, desktop computer, or server computer. More particularly, device 305, media distribution server 310, and social network server 315 may each take the form of electronic device 600.

Processor 605 may execute instructions necessary to carry out or control the operation of many functions performed by device 600. Processor 605 may, for instance, drive display 610 and receive user input from user interface 615. User interface 615 can take a variety of forms such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing units or cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An inter-network tracking method, the method comprising:
   transmitting, by a media distribution application of a first server, a second message containing a unique media product identifier to a social network application of a second server, the second message initiated in response to a first message received from a first device and including a recommendation directed to a digital media product corresponding to the unique media product identifier, the second message further including instructions configured to cause the social network application to send social network messages containing the recommendation, the unique media product identifier, and a screenshot corresponding to the digital media product to one or more second devices;
   requesting, by the media distribution application, the social network application to determine a number of occurrences in which the unique media product identifier appears in social network messages sent, by one or more sending devices, to, and only to, one or more third devices, wherein the one or more third devices are different from the first device and the one or more second devices, and wherein a social network message contains content originally created using the sending device; and
   receiving, by the media distribution application, an indication of the number of occurrences, responsive to the request.

2. The method of claim 1, wherein the one or more third devices have a social network relationship with the first device.

3. The method of claim 1, further comprising:
   generating, by the media distribution application, statistical data related to the unique media product identifier based on the indication of the number of occurrences; and
   determining, by the media distribution application, a rating of the digital media product based on the statistical data.

4. The method of claim 1, wherein the second message contains text automatically generated by a processor of the first server.

5. The method of claim 1, wherein the first message received from the first device is based on a selection of an automatically generated selectable template displayed on a display of the first device.

6. The method of claim 1, wherein the unique media product identifier comprises a link, the link selectable to cause a media application of a device to display one or more indicia corresponding to the digital media product.

7. The method of claim 6, wherein the one or more indicia are selectable to cause the media application of the device to retrieve and display the digital media product.

8. The method of claim 7, wherein retrieving the digital media product comprises downloading the digital media product from a server remote of the device.

9. The method of claim 1, wherein requesting the social network application to determine a number of occurrences in which the unique media product identifier appears comprises requesting, by the media distribution application, the social network application to determine a number of occurrences in which the unique media product identifier appears in private social network messages sent to the one or more second devices, wherein each of the private social network messages is associated with a social network account corresponding to the first device based on social network credentials corresponding to the first device.

10. The method of claim 1, wherein the social network messages contain one or more phrases indicative of positive feedback or negative feedback.

11. The method of claim 1, wherein the social network messages are sent over a certain time period.

12. A non-transitory computer readable storage medium storing instructions executable by one or more processors, the instructions comprising instructions to:
transmit, by a media distribution application of a first server, a second message containing a unique media product identifier to a first social network application of a second server, the second message initiated in response to a first message received from a first device and including a recommendation directed to a digital media product corresponding to the unique media product identifier, the second message further including instructions configured to cause the first social network application to send social network messages containing the recommendation and the unique media product identifier to one or more second devices;
transmit, by the media distribution application of the first server, a third message containing the unique media product identifier to a second social network application of a third server, the third message initiated in response to the first message received from the first device and including the recommendation directed to the digital media product corresponding to the unique media product identifier, the third message further including instructions configured to cause the second social network application to send social network messages containing the recommendation and the unique media product identifier to one or more additional devices;
request, by the media distribution application, the first social network application to determine a first number of occurrences in which the unique media product identifier appears in social network messages sent, using one or more first sending devices, only to one or more third devices, wherein the one or more third devices are different from the first device and the one or more second devices, and wherein a social network message contains content originally created using the one or more first sending devices;
request, by the media distribution application, the second social network application to determine a second number of occurrences in which the unique media product identifier appears in social network messages sent, using one or more second sending devices, only to one or more fourth devices, wherein the one or more fourth devices are different from the first device, the one or more second sending devices, and the one or more third devices, and wherein a social network message contains content originally created using the one or more second sending devices;
receive, by the media distribution application, an indication of the first number of occurrences and an indication of the second number of occurrences, responsive to the requests;
rank, by the media distribution application, the first number of occurrences and the second number of occurrences according to quantity; and
transmit, by the media distribution application to the first device, the first number of occurrences and the second number of occurrences for display according to their rank,
wherein the first social network application and the second social network application are different.

13. The non-transitory computer readable storage medium of claim 12, wherein the one or more third devices have a social network relationship with the first device.

14. The non-transitory computer readable storage medium of claim 12, wherein the instructions further comprise instructions to:
generate, by the media distribution application, statistical data related to the unique media product identifier based on the first number of occurrences and the second number of occurrences; and
determine, by the media distribution application, a rating of the digital media product based on the statistical data.

15. The non-transitory computer readable storage medium of claim 12, wherein the first message received from the first device is based on a selection of an automatically generated selectable template displayed on a display of the first device.

16. The non-transitory computer readable storage medium of claim 12, wherein the unique media product identifier comprises a link, the link selectable to cause a media application of a device to display one or more indicia corresponding to the digital media product.

17. The non-transitory computer readable storage medium of claim 16, wherein the one or more indicia are selectable to cause the media application of the device to retrieve and display the digital media product.

18. The non-transitory computer readable storage medium of claim 17, wherein retrieving the digital media product comprises downloading the digital media product from a server remote of the device.

19. The non-transitory computer readable storage medium of claim 12, wherein requesting the first social network application to determine a number of occurrences in which the unique media product identifier appears comprises requesting, by the media distribution application, the first social network application to determine a number of occurrences in which the unique media product identifier appears in private social network messages sent to the one or more second devices, wherein each of the private social network messages is associated with a social network account corresponding to the first device based on social network credentials corresponding to the first device.

20. The non-transitory computer readable storage medium of claim 12, wherein the social network messages contain one or more phrases indicative of positive feedback or negative feedback.

21. The non-transitory computer readable storage medium of claim 12, wherein the social network messages are sent during a certain time period.

* * * * *